United States Patent [19]

Ueda et al.

[11] Patent Number: 5,132,330
[45] Date of Patent: Jul. 21, 1992

[54] METHOD FOR MANUFACTURING EXPANDABLE STYRENE TYPE POLYMER PARTICLES

[75] Inventors: Yuichi Ueda, Takasago; Kiyoshi Mori, Kakogawa; Toshiaki Sugita, Akashi; Hideyuki Arakawa, Kobe, all of Japan

[73] Assignee: Kanegafuchi Kagaku Kogyo Kabushiki Kaisha, Osaka, Japan

[21] Appl. No.: 793,903

[22] Filed: Nov. 18, 1991

[30] Foreign Application Priority Data

Nov. 21, 1990 [JP] Japan ................................ 2-319844

[51] Int. Cl.$^5$ .............................................. C08J 9/20
[52] U.S. Cl. .................................... 521/56; 521/59; 521/146
[58] Field of Search .................................. 521/56, 59

[56] References Cited

U.S. PATENT DOCUMENTS

| 2,744,291 | 5/1956 | Stastny et al. | 521/56 |
| 4,968,466 | 11/1990 | Allen et al. | 521/56 |
| 4,990,540 | 2/1991 | Hahn et al. | 521/56 |

FOREIGN PATENT DOCUMENTS

| 49-2994 | 1/1974 | Japan . |
| 49-19107 | 5/1974 | Japan . |
| 49-19111 | 5/1974 | Japan . |
| 62-288608 | 12/1987 | Japan . |

Primary Examiner—Morton Foelak
Attorney, Agent, or Firm—Armstrong & Kubovcik

[57] ABSTRACT

A method for manufacturing expandable styrene type polymer particles is disclosed, which comprises the steps of adding a styrene type monomer to styrene type polymer seed particles suspended in an aqueous dispersing medium, continuously or intermittently to be polymerized while being absorbed thereby, and impregnating the resulting polymer particles with an easily volatile blowing agent to obtain expandable styrene type polymer particles, the improvement wherein styrene type polymer particles whose weight-average molecular weight ($\overline{M}w_1$) is not more than $\frac{2}{3}$ of the weight-average molecular weight ($\overline{M}w_2$) of the resulting polymer particles are used as said styrene type polymer particles. The present invention provides expandable styrene type polymer particles excellent in moldability and foamed articles high in strength and fine in external appearance.

4 Claims, No Drawings

METHOD FOR MANUFACTURING EXPANDABLE STYRENE TYPE POLYMER PARTICLES

BACKGROUND OF THE INVENTION

1. Field of the Invention

The present invention relates to a method for manufacturing expandable styrene type polymer particles uniform in particle size by adding a styrene type monomer to styrene type polymer seed particles uniform in particle size and suspended in an aqueous dispersing medium to thus cause the styrene type monomer to polymerize in said seed particles, and impregnating the resulting polymer particles with an easily volatile blowing agent. It provides expandable styrene type polymer particles which are not only excellent in moldability, but give foamed articles high in strength and fine in external appearance.

2. Description of the Prior Art

Expandable styrene type polymer particles release an easily volatile blowing agent (hereinafter referred to "blowing agent") contained therein to readily lose its expanding capability, and the time required therefor becomes shorter with particles smaller in size. Hence, when a mixture of particles different in size is expanded, a difference in expansion ratio results according to the particle size and the strength of foamed articles identical in density is lowered with increasing proportion of large-sized particles. When large-sized pre-expanded particles are included, it gives rise to such problems as deterioration of the charging property into a mold and difficulty to obtain a good foamed article. Furthermore, a foamed article obtained from particles broad in particle size distribution is different in the size of expanded particles, hence, not favorable in external appearance. From such a viewpoint, it is preferred to use those narrow in particle size as expandable styrene type polymer particles for producing a foamed article.

For obtaining expandable styrene type polymer particles, there have hitherto been known methods roughly classified into the following categories;

(1) A method for obtaining particles of a given size by suspension polymerization of a polymerizable monomer, then impregnating the resulting polymer with a blowing agent and finally sifting it.

(2) A method for suspension polymerizing a polymerizable monomer, then sifting the resulting polymer and finally impregnating only the particles of a given range of size with a blowing agent.

(3) A method for pelletizing a polymer to obtain pellets of a given size and then impregnating them with a blowing agent.

(4) The so-called seed polymerization method in which a polymerizable monomer is suspension polymerized, then only particles of a given size are taken out and suspended in water, subsequently a polymerizable monomer is added either continuously or intermittently for further polymerization in seeds, then the grown particles are impregnated with a blowing agent.

As to the method (1), however, all particles are impregnated with the blowing agent, and hence, the particles containing the blowing agent but not suited for intended uses because of their particle size being outside the intended range have to be treated for some other use, which becomes a heavier burden with increasing the amount of production.

As to the method (2), since the polymer particles are used after sifting, the process of producing polymer particles and that of impregnating them with the blowing agent are necessarily separated, which results in complication of the process and also an increase in cost. Further, by this method, too, like the method (1), the burden of treating the particles off the desired range of the particle size for some other suitable use cannot be avoided, either.

In the method (3), too, the pelletizing step is required in addition to the polymer producing step and the step of impregnation with the blowing agent, the overall process being thus highly complicated. The cells formed by expanding the expandable particles are extremely small and it is difficult to obtain a good foamed article.

In order to eliminate the aforementioned defects there has been proposed the method (4) in Japanese Examined Patent Publication No. 49-2994, i.e., the seed polymerization method. According to this method, it is possible to manufacture styrene type polymer particles having the desired narrow particle size distribution according to the uniformity in size of the seed particles suspended in the medium by suspending polymer particles uniform in particle size in water and adding monomers containing a polymerization initiator.

Expandable styrene type polymer particles can be obtained by impregnating in an aqueous suspension the styrene type polymer particles so obtained with a blowing agent, i.e., an easily volatile aliphatic hydrocarbon such as n-pentane, which slightly swells the polymer particles, or by impregnating in an aqueous suspension a blowing agent such as butane and propane which are gaseous at the normal temperature together with a small amount of solvent such as toluene and cyclohexane capable of dissolving the polymer particles.

The expandable styrene type polymer particles so prepared are used as a material for manufacture of styrene type foamed articles. For industrial manufacture of foamed articles, the most common method is to first expand by steam heating or the like the expandable styrene type polymer particles to prepare pre-expanded particles, then charge the pre-expanded particles into a closed mold in the desired shape having many small holes in its wall, heat the pre-expanded particles to a temperature higher than the softening point of a polymer of the pre-expanded particles by letting a heating medium such as steam out through the small holes in the mold to thereby have the expanded particles fused together and then remove a foamed article from the mold after cooling.

The foamed article obtained by the aforementioned method is formed through further expansion of the pre-expanded particles inside the mold to fill the gaps among the particles, but it is extremely difficult to obtain a foamed article completely free of inter-particle gaps. In the vicinity of the wall of the mold, in particular, the charging rate for the pre-expanded particles is lower than elsewhere, hence it is quite difficult to completely fill the inter-particle gaps, and in consequence, in the foamed article obtained there exist inter-particle gaps as superficial hollows. The existence of such inter-particle gaps on the surface of the foamed article not only deteriorates the external appearance of the foamed article, but also causes a decrease in the strength thereof.

For solving this problem, many attempts have been made for improving the expandability by incorporating a plasticizer which has a plasticizing potential to styrene type polymer particles. Incorporation of the plasticizer, however, causes lowering of the softening point of styrene type polymer particles, that of the surface layer thereof, in particular, which causes aggregation of particles in the course of pre-expansion or melting of the surface in the course of expansion molding.

SUMMARY OF THE INVENTION

It is a primary object of the present invention to provide a method for manufacturing expandable styrene type polymer particles giving a foamed article with less inter-particle gaps through nearly perfect fusion in the boundary plane among the individual expanded particles.

Other objects and advantages of the present invention will become apparent to those skilled in the art from reading of the following description.

The present inventors have found out that the aforementioned objects can be accomplished through the employment of styrene type polymer seed particles whose weight-average molecular weight ($\overline{M}w_1$) is not more than $\frac{2}{3}$ of the weight-average molecular weight ($\overline{M}w_2$) of the resulting polymer particles.

DETAILED DESCRIPTION OF THE INVENTION

The present invention relates to a method for manufacturing expandable styrene type polymer particles comprising the steps of adding a styrene type monomer to styrene type polymer seed particles suspended in an aqueous dispersing medium, continuously or intermittently to be polymerized while being absorbed thereby, and impregnating the resulting polymer particles with a volatile blowing agent to obtain expandable styrene type polymer particles, the improvement wherein styrene type polymer particles whose weight-average molecular weight ($\overline{M}w_1$) is not more than $\frac{2}{3}$ of the weight-average molecular weight ($\overline{M}w_2$) of the resulting polymer particles are used as said styrene type polymer seed particles.

The seed particles of a styrene type polymer used in the present invention are granules of a generally known styrene type polymer. As such particles, there are included homopolymer particles or copolymer particles of styrene and styrene derivatives such as α-methylstyrene, paramethylstyrene, t-butylstyrene and chlorostyrene.

The size of the aforementioned particles is preferred to be as uniform as possible, because it is reflected on the particle size distribution of the resultant expandable styrene type polymer particles. As such styrene type polymer particles, preferred are a group of particles substantially uniform in particle size with not less than 90% by weight, preferably not less than 99% by weight, of the particles being 0.9-1.1 times of the volume-average particle size of the whole particles suspended in water. For easily obtaining such particles uniform in particle size, there is known a method in which a polymerizable monomer is dispersed in an aqueous medium as a group of liquid droplets uniform in size by passing them through a nozzle under a condition of regular vibration and such droplets are polymerized without aggregation or further dispersion. Alternatively, it is also possible to obtain such particles by classifying polymer particles obtained by an ordinary suspension polymerization method. As to the amount of such particles used, it is preferred to be 5-60% by weight, more preferably 5-30% by weight, of the whole amount of polymer formed upon completion of polymerization. If the amount is less than 5% by weight, the proportion of the added monomer which polymerizes into powder irrelevantly to the seed polymerization, not being used for growth of seed particles, increases. If, on the other hand, the amount is too much, the ratio of the size of the grown particles to the size of the seed particles becomes small, which is disadvantageous economically.

The polymerizable monomer added for polymerization in the present invention is any monomer used in an conventional suspension polymerization and as such monomer, there are included styrene and styrene derivatives such as α-methylstyrene, paramethylstyrene, t-butylstyrene and chlorostyrene, these monomers being usable either alone or in combination of two or more. Also, bifunctional monomers such as divinyl benzene and alkylene glycol dimethacrylate can be used in combination with the above.

As polymerization initiators for the aforementioned monomers in the present invention, radical generation-type polymerization initiators generally used in the production of thermoplastic polymers are usable. Typical examples are organic oxides such as benzoyl peroxide, lauroyl peroxide, t-butylperbenzoate, t-butylperpivarate, t-butylperoxy isopropylcarbonate, t-butylperoxy acetate, 2,2-di-t-butylperoxy butane, t-butylperoxy 3,3,5-trimethylhexanoate, di-t-butylperoxy hexahydroterephthalate and 3,3,5-trimethyl cyclohexane, and azo compounds such as azobisisobutylonitrile and azobisdimethylvaleronitrile.

Such polymerization initiators are usable either alone or in combination of two or more, but, for proper adjustment of the molecular weight and reduction of the residual amount of monomer, it is effective to use two or more of polymerization initators different in decomposition temperature.

The suspending agent used in the present invention is an ordinary one generally used, for example, water-soluble high molecular compounds such as polyvinyl alcohol, methyl cellulose, polyacryl amide and polyvinyl pyrrolidone or water-scarcely-soluble inorganic substances such as tribasic calcium phosphate and magnesium pyrophosphate. When the water-scarcely-soluble inorganic substance is used, the suspension stabilizing effect can be improved by additional use of an anionic surfactant such as sodium dodecyl benzene sulfonate. The joint use of the water-soluble high molecular compound and the scarcely-soluble-inorganic substance is also effective.

The blowing agent used in the present invention is an easily volatile organic compound which is normally liquid or normally gaseous but liquid under pressure and of which boiling point is not higher than the softening point of the polymer. As such blowing agents, there are included aliphatic hydrocarbons such as propane, butane, pentane and hexane, cycloaliphatic hydrocarbons such as cyclobutane, cyclopentane and cyclohexane, and halogenated hydrocarbons such as methyl chloride, dichlorodifluoromethane and dichlorotetrafluoroethane. Such blowing agents can be used either alone or in combination of two or more.

According to the present invention, it is by no means prohibited to use, besides the aforementioned materials, any substance generally used in the production of expandable styrene type polymer particles such as nucleating agents, plasticizers, solvents and flame retarding agents.

The manufacturing method of the present invention comprises steps of suspending styrene type polymer seed particles in an aqueous medium and adding styrene type monomers thereto for polymerization to proceed and is characterized in that as styrene type polymer seed particles are used those whose weight-average molecular weight is not more than ⅔ of the weight-average mlecular weight of the resulting polymer particles.

When styrene type polymer seed particles used are as low in molecular weight as mentioned above, the polymer particles finally obtained are wide in molecular weight distribution between the higher and the lower molecular weight, thus resulting in expandability in a wide range of temperature. The expandable styrene type polymer particles thus obtained are excellent in expandability, fused together almost perfectly in the boundary plane to form a foamed article with less interparticle gaps. Moreover, since expandable styrene type polymer particles manufactured by the method of the present invention have low molecular substances existing near the center of the particles, unlike those containing the plasticizer uniformly as seen in the conventional art, there is no risk of the softening point of the surface layer of the particles getting lower and there is no problem of particles being aggregated during pre-expansion or of the surface of the particles being melted during expansion molding.

Examples and comparative examples of the present invention will be given below for description of the invention in greater detail but, needless to say, the present invention is in no way limited thereby.

EXAMPLES 1-3

1.8 liters of pure water, 7.2 g of tricalcium phosphate, 20 ml of 1% by weight aqueous solution of sodium α-olefin sulfonate, 360 g of seed particles whose average particle size range is between 0.59 and 0.50 mm, whose average particle size is 0.53 mm, and whose weight-average molecular weight ($\overline{M}w_1$) is as shown in Table 3, and 8.1 g of ethylene bis-stearic acid amide whose particle size is 5-15 μm were added to a 5-liter reactor provided with a stirrer, and the temperature of the dispersion in the reactor was raised to 90° C. under stirring. Then, a solution prepared by dissolving 12.6 g of coconut oil in 1390 g of styrene monomer and an emulsion prepared by dissolving 5 g of benzoyl peroxide and 1.8 g of 1, 1-di-t-butylperoxy-3, 3,5,-trimethylcyclohexane in 50 g of styrene monomer and then emulsifying them in 50 g of a 0.2% by weight aqueous solution of hydroxyethyl cellulose were continuously charged into the reactor at the rates shown in Table 1, respectively, and polymerization was conducted at 90° C.

TABLE 1

| Condition | Time elapsed (Hr) | | |
|---|---|---|---|
| | 0-2 | 2-4 | 4-5 |
| Charging rate of styrene monomer solution (g/Hr) | 160 | 303 | 465 |
| Charging rate of emulsion of polymerization initiator (g/Hr) | 13 | 25 | 31 |

Immediately after completion of charging of the styrene monomer solution and the emulsion of polymerization initiator, 32 g of cyclohexane and 153 g of butane were added as a blowing agent, and the temperature of the reaction mixture was raised to 115° C. and polymerization and impregnation with the blowing agent were continued for 3 hours. After cooling, the obtained expandable styrene polymer particles are taken out and after dehydration and subsequent drying, the expandable styrene polymer particles were heated with steam by means of a batch type pre-expander and pre-expanded particles with an apparent volume of 60-fold were obtained.

The aforementioned pre-expanded particles were aged and dried for 24 hours in the atmosphere and then expansion molded by Pearlstar 90 Automatic Molding Machine (Toyo Kikai Kinzoku K.K.) with cavity dimensions of 300 mm×450 mm×20 mm. The inner fusion rate, inner condition and suface condition of the foamed article obtained are shown in Table 3.

The inner condition in Table 3 means the condition of inter-particle gaps of a flat plate of 300 mm×450 mm×5 mm cut out from the central part of the foamed article.

The surface condition shows the smoothness and the inter-particle gaps in the surface of the foamed article.

The inner fusion rate means the inter-particle fusion rate appearing in the fracture of the foamed article, and it is represented by percentage, against the whole number of particles in the plane of the fracture, of the number of particles cleaved in their insides and not parted in the boundary plane between particles in the plane of the fracture.

COMPARATIVE EXAMPLES 1, 2

Pre-expanded particles were obtained in the same manner as Examples 1-3 except that seed particles used were in a particle size range of 0.59-0.50 mm and the weight-average molecular weight ($\overline{M}w_1$) thereof was as shown in Table 3. Then, foamed articles were obtained using the aforementioned pre-expanded particles and measurement and evaluation were made in the same way as Examples 1-3. The results are shown in Table 3.

COMPARATIVE EXAMPLE 3

Pre-expanded particles were obtained in the same manner as Examples 1-3 except that seed particles used were in a particle size range of 0.59-0.50 mm and the weight-average molecular weight ($\overline{M}w_1$) thereof was as shown in Table 3, 36 g of toluene was further added to the monomer solution and the resulting monomer solution and the emulsion were charged at the rates shown in Table 2, respectively. Then, foamed articles were obtained using the aforementioned pre-expanded particles and measurement and evaluation were made in the same way as Examples 1-3. The results are shown in Tabled 3.

TABLE 2

| Condition | Time elapsed (Hr) | | |
|---|---|---|---|
| | 0-2 | 2-4 | 4-5 |
| Charging rate of styrene monomer solution (g/Hr) | 164 | 311 | 477 |
| Charging rate of emulsion of polymerization initiator (g/Hr) | 13 | 25 | 31 |

TABLE 3

|  | Weight-average molecular weight of seed particles ($\overline{M}w_1$) | Weight average-molecular weight of polymer particles after completion of seed polymerization ($\overline{M}w_2$) | Solvent (toluene) (Parts*) | Inner fusion rate of foamed article (%) | Inner condition of foamed article | Surface condition of foamed article |
|---|---|---|---|---|---|---|
| Example 1 | 127000 | 259000 | — | 100 | No gaps | Excellent |
| Example 2 | 162000 | 272000 | — | 100 | No gaps | Excellent |
| Example 3 | 185000 | 281000 | — | 100 | No gaps | Excellent |
| Comparative Example 1 | 223000 | 285000 | — | 90 | Some gaps | Rather bad |
| Comparative Example 2 | 274000 | 292000 | — | 80 | Many gaps | Bad |
| Comparative Example 3 | 274000 | 287000 | 2.0 | 90 | Some gaps | Rather bad |

*Parts by weight to 100 parts by weight of expandable styrene polymer particles

Expandable styrene type polymer particles wide in molecular weight distribution from low molecular weight to high molecular weight and broad in a temperature range for expansion are obtainable by using styrene type polymer seed particles with their weight-average molecular weight not more than ⅔ of that of the obtained polymer particles. Such polymer particles are excelled in expandability and provide foamed articles fused toghether nearly perfectly in the boundary plane with almost no inter-particle gaps. Moreover, expandable styrene type polymer particles manufactured by the method of the present invention have low molecular weight near the center of the particles, hence, there is no risk of the softening point of the surface layer thereof getting lower, thus precluding aggregation of particles in the course of pre-expantion or melting of the surface in the course of expansion molding.

As described above, the present invention is capable of providing expandable styrene type polymer particles excellent in moldability and foamed articles high in strength and fine in external appearance.

What is claimed is:

1. A method for manufacturing expandable styrene polymer particles comprising the steps of adding continuously or intermittently at least one styrene monomer to styrene polymer seed particles suspended in an aqueous dispersing medium, polymerizing the styrene monomer while it is absorbed by the polymer seed particles, and impregnating the resulting polymer particles with an easily volatile blowing agent to obtain expandable styrene polymer particles, wherein said styrene polymer seed particles prior to polymerization of the added styrene monomer have a weight-average molecular weight ($\overline{M}w_1$) of not more than ⅔ of the weight-average molecular weight ($\overline{M}w_2$) of the resulting polymer particles.

2. The method of claim 1, wherein the amount of styrene polymer seed particles prior to the start of polymerization is 5-60% by weight of the whole amount of polymer upon completion of polymerization.

3. The method of claim 1 or 2, wherein not less than 90% by weight of styrene polymer seed particles prior to the start of polymerization have a particle size 0.9-1.1 times of the volume-average particle size of the entirety of particles prior to the start of polymerization.

4. The method of claim 1, wherein said styrene monomer is at least one member selected from the group consisting of styrene, α-methylstyrene, paramethylstyrene, t-butylstyrene and chlorostyrene.

* * * * *